US009807127B2

(12) United States Patent
Cheung et al.

(10) Patent No.: US 9,807,127 B2
(45) Date of Patent: *Oct. 31, 2017

(54) METHOD AND APPARATUS FOR DISTRIBUTED COMPOSITIONAL CONTROL OF END-TO-END MEDIA IN IP NETWORKS

(71) Applicant: AT&T Intellectual Property II, L.P., Atlanta, GA (US)

(72) Inventors: Eric Cheung, New York, NY (US); Pamela Zave, Summit, NJ (US)

(73) Assignee: AT&T INTELLECTUAL PROPERTY II, L.P., Atlanta, GA (US)

(*) Notice: Subject to any disclaimer, the term of this patent is extended or adjusted under 35 U.S.C. 154(b) by 58 days.

This patent is subject to a terminal disclaimer.

(21) Appl. No.: 14/930,265

(22) Filed: Nov. 2, 2015

(65) Prior Publication Data

US 2016/0057172 A1    Feb. 25, 2016

Related U.S. Application Data

(63) Continuation of application No. 13/901,420, filed on May 23, 2013, now Pat. No. 9,178,914, which is a (Continued)

(51) Int. Cl.
*H04L 12/66*     (2006.01)
*H04M 1/64*     (2006.01)
(Continued)

(52) U.S. Cl.
CPC ...... *H04L 65/1046* (2013.01); *H04L 65/1013* (2013.01); *H04L 65/1069* (2013.01)

(58) Field of Classification Search
CPC ............ H04L 12/56; H04L 2012/5604; H04L 2012/564; H04L 29/06; H04L 29/06571; H04L 29/08306; H04L 29/08594; H04L 41/0233; H04L 45/44; H04L 47/16; H04L 47/18; H04L 47/2466; H04L 63/0218;
(Continued)

(56) References Cited

U.S. PATENT DOCUMENTS 5,991,771 A * 11/1999 Falls ................. G06F 9/466
6,178,529 B1 * 1/2001 Short .............. G06F 11/2038
709/223

(Continued)

*Primary Examiner* — Alpus H Hsu

(57) ABSTRACT

A method and an apparatus for performing a distributed control of end-to-end media on packet networks such as Voice over Internet Protocol and Service over Internet Protocol networks are disclosed. The method first receives a request from a first media endpoint device for closing at least one media channel to a second media endpoint device wherein the request contains a descriptor of the first media endpoint device. The method then updates one or more slot states and link states in response to the request and records the current state of each slot for supporting the media channel. The method also records the most recently received descriptor of the media endpoint device as a most recent descriptor for the slot supporting the media channel. The method executes one or more link objects in response to the request for controlling the at least one media channel.

20 Claims, 13 Drawing Sheets

Related U.S. Application Data continuation of application No. 11/618,903, filed on Dec. 31, 2006, now Pat. No. 8,451,725.

(51) Int. Cl.
*H04M 3/00* (2006.01)
*H04M 5/00* (2006.01)
*G06F 15/16* (2006.01)
*H04L 29/06* (2006.01)

(58) Field of Classification Search
CPC ............ H04L 65/1013; H04L 65/1046; H04L 65/1066; H04L 65/1069; H04L 69/169; H04Q 11/0478
See application file for complete search history.

(56) References Cited

U.S. PATENT DOCUMENTS

| | | |
|---|---|---|
| 6,515,966 B1 | 2/2003 | Bardalai et al. |
| 6,822,942 B1 | 11/2004 | Jackson et al. |
| 6,888,937 B1 | 5/2005 | Kurapati |
| 7,092,356 B2 | 8/2006 | Rabie et al. |
| 7,099,895 B2 * | 8/2006 | Dempsey ................. G01S 5/02 |
| 7,363,387 B1 | 4/2008 | Chandra et al. |
| 7,529,269 B1 | 5/2009 | Bhat et al. |
| 7,702,090 B1 | 4/2010 | Praturi et al. |
| 7,848,507 B2 | 12/2010 | Cheung et al. |
| 8,019,587 B1 | 9/2011 | Venkatraman et al. |
| 8,356,053 B2 * | 1/2013 | Murthy ............ G06F 17/30917 707/781 |
| 8,451,725 B1 | 5/2013 | Cheung et al. |
| 8,909,712 B2 * | 12/2014 | Singh ................ G06F 17/30575 709/206 |
| 9,497,292 B2 * | 11/2016 | Goldman ................. H04L 67/42 |
| 2002/0156900 A1 | 10/2002 | Marquette et al. |
| 2004/0081183 A1 | 4/2004 | Monza et al. |
| 2004/0218586 A1 | 11/2004 | Khoury et al. |
| 2005/0047389 A1 | 3/2005 | Bond et al. |
| 2006/0020854 A1 | 1/2006 | Cardona et al. |
| 2008/0222267 A1 | 9/2008 | Horn |
| 2010/0202450 A1 | 8/2010 | Ansari et al. |

* cited by examiner

400

500

METHOD AND APPARATUS FOR DISTRIBUTED COMPOSITIONAL CONTROL OF END-TO-END MEDIA IN IP NETWORKS

This application is a continuation of U.S. patent application Ser. No. 13/901,420, filed May 23, 2013, now U.S. Pat. No. 9,178,914, and is a continuation of U.S. patent application Ser. No. 11/618,903, filed Dec. 31, 2006, now U.S. Pat. No. 8,451,725, all of which are herein incorporated by reference in their entirety.

The present invention relates generally to communication networks and, more particularly, to a method for controlling end-to-end media when services are provided on packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous and more and more businesses and consumers are relying on their Internet connections for all of their communications needs. For example, customers use the Internet based infrastructure for video, voice and data transmission applications. The services are provided through application servers located in the IP network. The servers influence the end-to-end signaling to modify it for their purpose and gain control over the media channel. However, when multiple servers have jurisdiction over the same media channel and each server is changing the end-to-end signaling independently, the resulting state of the media channel may become chaotic and may result in an abnormal effect on the media channel. Currently, network operators attempt to reduce the occurrence of abnormal effects by deploying a centralized media controller and having all application servers in the network report all changes to the centralized media controller. The centralized computation of all graphs of the signaling creates a performance bottleneck. Moreover, since the application servers may have administrative independence, it does nothing to coordinate the actions taken by each application server.

Therefore, there is a need for a method that provides distributed compositional control of end-to-end media channels in an IP network.

SUMMARY OF THE INVENTION

In one embodiment, the present invention discloses a method and apparatus for a distributed compositional control of end-to-end media channels in IP networks such as the Voice over Internet Protocol (VoIP) and Service over Internet Protocol (SoIP) networks. The method first receives a request from a first media endpoint device for opening at least one media channel to a second media endpoint device wherein said request contains a descriptor of said first media endpoint device. The method then updates one or more slot states and link states in response to said request and records the current state of each slot for supporting said media channel. The method also records the most recently received descriptor of said media endpoint device as a most recent descriptor for said slot supporting said media channel. The method executes one or more link objects in response to said request for controlling said at least one media channel.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for distributed compositional control of end-to-end media in packet networks such as Voice over Internet Protocol (VoIP) and Service over Internet Protocol (SoIP) networks. Although the present invention is discussed below in the context of VoIP and SoIP networks, the present invention is not so limited. Namely, the present invention can be applied in other networks where services are provided using multiple application servers such as the traditional telephone networks, cellular networks, etc.

Figure 1:
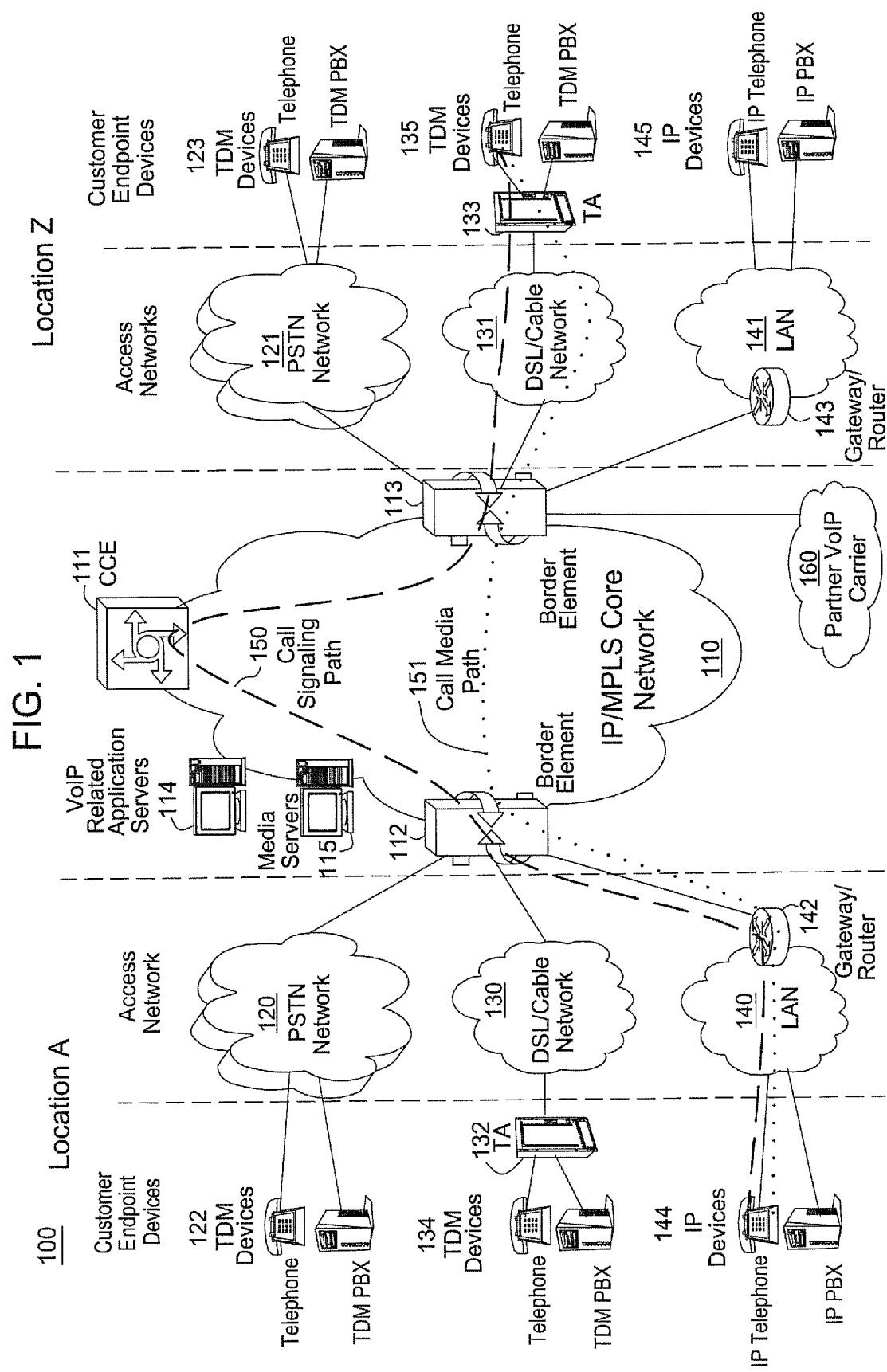
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network. It should noted that a SoIP network is broadly capable of supporting media channels that provide data such as voice, video, music, images, text or any combinations of the preceding.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. call waiting, translation of an E.164 voice network address into an IP address, etc. The CCE forwards the signaling towards the application servers and receives responses. The application server remains in the signaling path unless it has no mid-call function. Although FIG. 1 shows few servers and a CCE, those skilled in the art realize, a call may involve many application servers and multiple call control elements.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup-signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement-signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. FIG. 1 shows an example of a call with the signaling path and the media path being different. That is because the exemplary call that has been setup between the two endpoints doesn't need the CCE to remain in the media path in this particular instance. In other examples, a call may be setup using multiple CCEs and the CCEs may remain in the signaling path.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location a using any endpoint device type with its associated access network type can communicate with another customer in location Z using any endpoint device type with its associated network type as well. For instance, a customer at location a using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided on networks such as VoIP and SoIP networks. Although the above network is illustrated using a SIP protocol, any protocol such as SS7, Distributed Feature Compositional (DFC) protocol and the like may be used. Consumers and businesses are continuing to rely on various Internet services provided on multiple application servers in an IP network. For example, customers may use the Internet based infrastructure for video, voice and data transmission applications. Often, the services are provided through multiple application servers located in the IP network. Each server may influence the end-to-end signaling to modify the signaling for its own purpose and to gain control over the media channel. However, when multiple servers have jurisdiction over the same media channel and each server is changing the end-to-end signaling independently, the resulting state of the media channel may become chaotic and may result in an abnormal effect on the media channel. Currently, network operators attempt to reduce the occurrence of abnormal effects by deploying a centralized media controller and having all application servers in the network report all changes to the centralized media controller. The centralized computation of all graphs of the signaling creates a performance bottleneck. Moreover, since the application servers may have administrative independence, it does nothing to coordinate the actions taken by each application server. In addition, a codec choice is managed in an ad-hoc manner since the codec options are not known.

In one embodiment, the current invention discloses a method and apparatus for a distributed compositional control of end-to-end media channels in IP networks. The customer subscribes to services and accesses multiple features provided on multiple servers in the core network, e.g., an IP/MPLS network. The present invention provides an algorithm to be run by application servers and media endpoints such that the media channel is controlled by the distributed compositional actions of the multiple application servers and endpoints. In order to clearly illustrate the teachings of the current invention, the following terminologies and networking concepts will first be described:

A media endpoint;
An application server;
IP media channel;
Feature; and
Compositional media control.

A media endpoint (or just endpoint) is any source or a sink of a media stream. Media endpoints include user I/O devices, content servers, and media-processing resources. Media-processing resources perform a wide range of functions including mixing, replicating, recording, playback, digital signal processing of many kinds, and higher-level functions such as speech recognition.

An application server (or just server) is any server whose primary function is application control rather than media processing.

An IP media channel refers to a communications channel established through the use of an IP signaling protocol. The protocol creates an agreement by which media endpoints know where and in what format to transmit media. The protocol also tells the endpoints from where and in what format they can expect to receive the media. Namely, in order to set up a media flow in each direction between two endpoints, the sender in that direction must know the receiver's IP address and port number. Both endpoints must also know the codec (coder-decoder) that is being used for the media stream in that direction. A codec refers to a data format for a medium. For example, G.726 is a lower-fidelity and lower-bandwidth codec for voice, while G.711 is a higher-fidelity and higher-bandwidth codec for voice. G.711 is approximately equivalent in fidelity to circuit-switched telephony. Until the agreement changes, the endpoints continue to transmit media directly to each other, without further use of the signaling protocol.

Feature refers to a program module that modifies or enhances a basic communication service. The current invention deals with features that operate on media channels, e.g. features that switch, hold, conference (mix), replicate, mute, open, or close media channels. In telecommunications, these features may include features that employ the voice channel for signaling (through announcements, prompts, touch tones, voice recognition, etc.), because all such features have to switch user voice channels to and from voice-processing servers. It should be noted that features can reside anywhere in an IP network. Features that reside at the edge, e.g., features in media endpoints, may use their IP signaling protocol in the role of endpoints to make the necessary changes in media transmission. Features that reside in the network core, on the other hand, are inserted into the relevant end-to-end signaling paths by the servers. Once inserted in the signaling path, the features that reside in the network core participate in the end-to-end signaling as either "application servers", "proxy servers", or "back-to back user agents", to influence the signaling for their own purposes. However, the problem of compositional media control as defined below arises from the fact that multiple features, in endpoints and in the network, can have jurisdiction over the same media channel and each may be attempting to perform media control independently. The result can be chaotic and may not be a correct composition of the intentions of the various features.

Compositional media control refers to control of a media channel based on a rational composition of the intentions of various features such that the correct behavior is produced regardless of the number of active features. In one embodiment of the current invention, a media control protocol designed for compositional behavior such as Distributed Feature Composition (DFC) is used.

Figure 2:
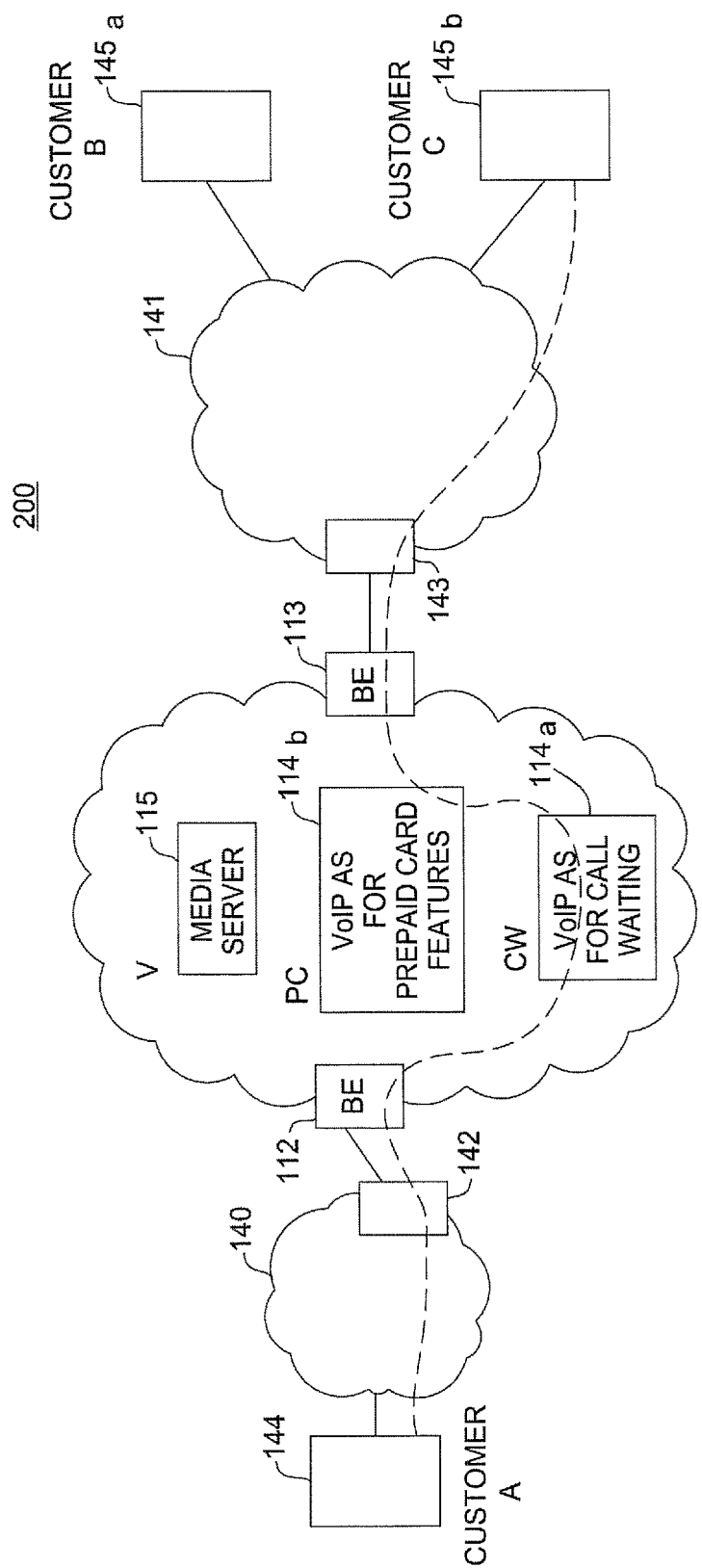
FIG. 2 provides an illustration of an exemplary telecommunication network.

FIG. 2 provides an illustration of a telecommunication network 200 which may benefit from compositional media control. To illustrate, customer "A" is using the IP device 144 to access IP services such as VoIP and SoIP services. IP device 144 is connected to the access network 140. The access network 140 contains a gateway router 142. The gateway router is connected to a core network, e.g., an IP/MPLS core network 110 through a border element 112. In this example, VoIP application servers 114a and 114b are deployed in the IP/MPLS core network. The service provider utilizes the application server 114a to provide call waiting features, and application server 114b to provide prepaid calling card features. Similarly, other subscribers may use the IP devices 145a and 145b to access the IP services. For example, customer "B" is accessing services via IP device 145a and customer "C" is accessing services via IP device 145b. The IP devices 145a and 145b are connected to the access network 141. The access network 141 contains a gateway router 143. The gateway router is connected to the IP/MPLS core network 110 through a border element 113. Note that only the network elements needed for describing the present invention are included. Other network elements needed for VoIP or SoIP services are omitted for simplicity.

Figure 3:
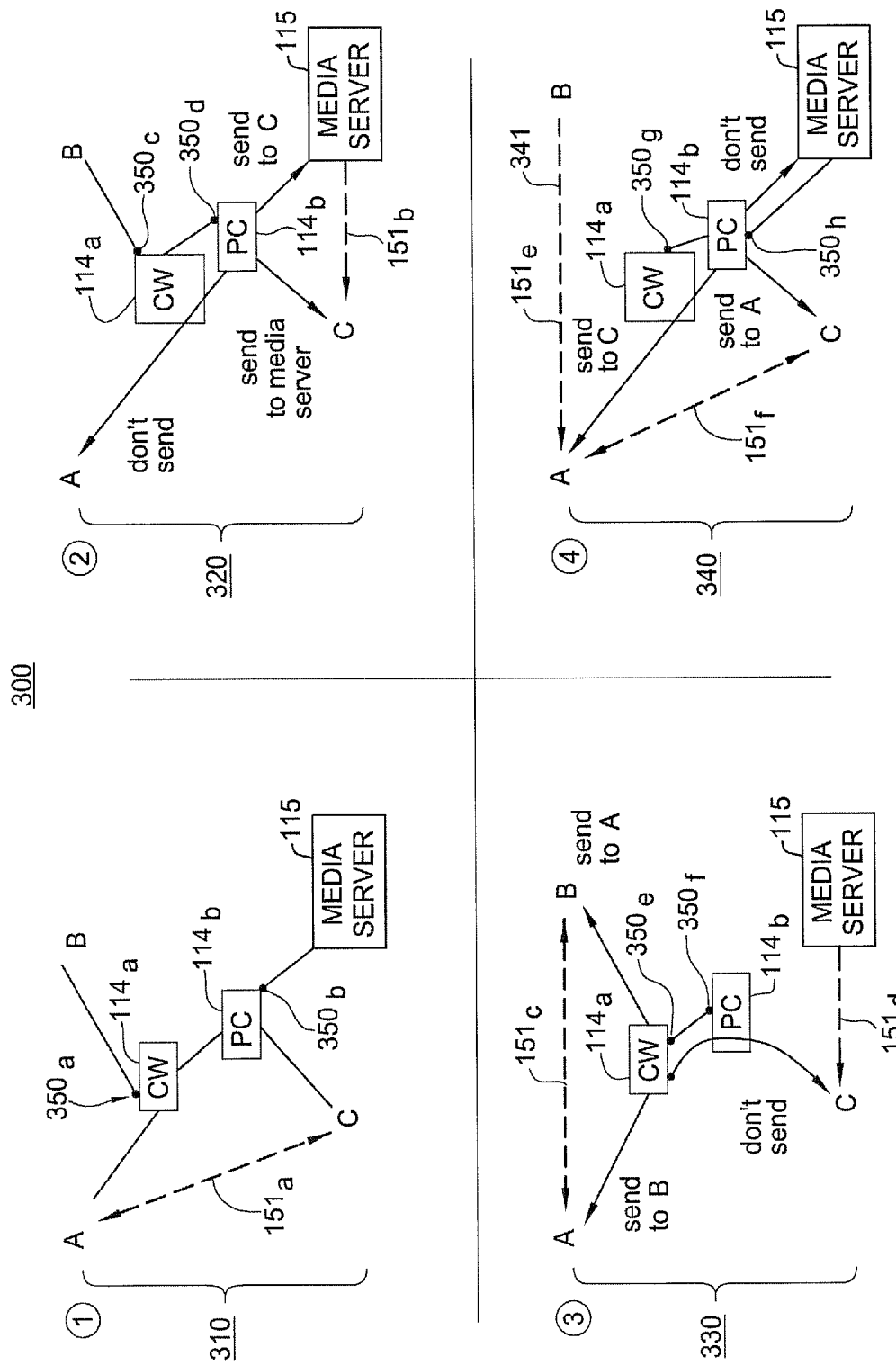
FIG. 3 provides a plurality of simplified snapshot views of communications among a plurality of customers.

FIG. 3 illustrates a plurality of simplified snapshot views of the communications among customers "A", "B" and "C" as described above in FIG. 2. Customer A is a subscriber of call waiting; customer A has a signaling channel to the call waiting server 114a, and all signaling channels connecting customer A to other users radiate from the call waiting server 114a.

Snapshot 310 arose because customer A was talking to customer B. Then, while customers A and B were talking, customer C (a user of a prepaid card) contacted the prepaid-card server 114b and used a prepaid-card to call customer A. Customer A received notification of the incoming call and switched to talk to customer C leaving customer B on hold. Customer A is then in communications with customer C using media path 151a. Because customer B is on hold, there is no voice channel between customer B and any other endpoint.

Snapshot 320 shows what happens when the funds of the prepaid-card become exhausted. A timer goes off in the prepaid-card server 114b and the server 114b sends three signals: a signal to customer A telling customer A to stop sending media; a signal to customer C telling customer C to send media to a voice processing resource V in media server 115; and a signal to the voice processing resource V in media server 115 telling it to send media to customer C. The signals have a combined effect of putting customer A on hold, and connecting customer C to the media server 115. The only voice channel after all the endpoints respond to all the commands is between customer C and the voice processing capability V in media server 115. The voice-processing capability V in media server 115 serves as the user interface to the prepaid-card server 114b. The media server 115 prompts customer C to supply additional funds using media path 151b and may receive authorization by means of touch tones.

Snapshot 330 shows what happens when the next event is that customer A uses call waiting to switch back to customer B using media path 151c. The call-waiting server 114a sends three signals appropriate to this function: a signal to customer A telling customer A to send media to B; a signal to customer B telling customer B to send media to customer A; and a signal to customer C telling customer C to stop sending media. The signal to customer C passes through the prepaid card server 114b untouched. Although the signals are appropriate from the perspective of the call waiting server 114a, they have the abnormal effect of leaving the voice processing capability V in media server 115 without voice input from customer Con media path 151d. Note that the media path 151d has input only in the direction of customer C and the arrow between C and V is one-way.

Snapshot 340 shows what happens when the next event is that the media server 115 completes authentication of the funds from customer C (presumably supplied before customer C was cut off) and reconnects customer C with customer A on media path 151f. The prepaid card server 114b sends a signal to customer A telling customer A to send media to customer C; a signal to customer C telling customer C to send media to customer A; and a signal to V telling it to stop sending media. Although the signals are appropriate from the perspective of the prepaid card server 114b, they have an abnormal effect. Because the signal from the prepaid card server 114b is forwarded blindly by the call waiting server 114a, it switches customer A from B to C without customer A's permission. The abnormal effect in this case is that a media connection between customers "A" and "C" is created. Customer "A" neither requested nor expected the media connection to be created and the conversation between customer "A" and "B" to be interrupted. Furthermore, B is left transmitting to an endpoint (customer A) that will throw away the packets because customer A has been instructed to communicate with customer C.

The problem illustrated in FIG. 3 occurs because each server is sending commands to the endpoints without knowledge of the other server, even though the behavior of the endpoints and media paths should be a composition of the actions of the two servers 114a and 114b. For example, customer C should be connected to customer A if and only if customer A has used call waiting to switch to customer C, and the prepaid-card server 114b has a reserve of funds from customer C. One goal of the present invention is to provide a method that produces compositional media control with the correct behavior at all times, regardless of how many features are active.

Note that both the call waiting box 114a and the prepaid card box 114b for the example illustrated in FIG. 3 are in the signaling path between customers A and C and each box sees some of the signals of the other box. Signaling paths are assembled in accordance with the overall goal of the communication service. If the functions of two feature boxes both apply to a media transmission between the two endpoints, then both feature boxes must be in the signaling path between the endpoints. In addition, if the functions of a feature box have priority over the functions of other feature boxes in determining the media behavior observable at a particular endpoint, the feature box associated with the higher priority function must be closer to the endpoint than the other feature boxes in the signaling path between the two endpoints. With respect to the media behavior observable by customer A, the call waiting feature box has priority over the prepaid card feature box. While the call waiting feature box is connecting between customers A and B, no action of the prepaid card feature box should affect customer A.

The current invention provides a compositional method for control of end-to-end media regardless of how many features are active in the IP networks. The method can be used to program any feature functionality and works for all interleaving of events. This is important because, as shown in the example above, features often reconfigure media pathways in response to external events such as timeouts that are not synchronized with events of the media protocol. Furthermore, the programmer's interface is declarative and simple for implementation.

Figure 4:
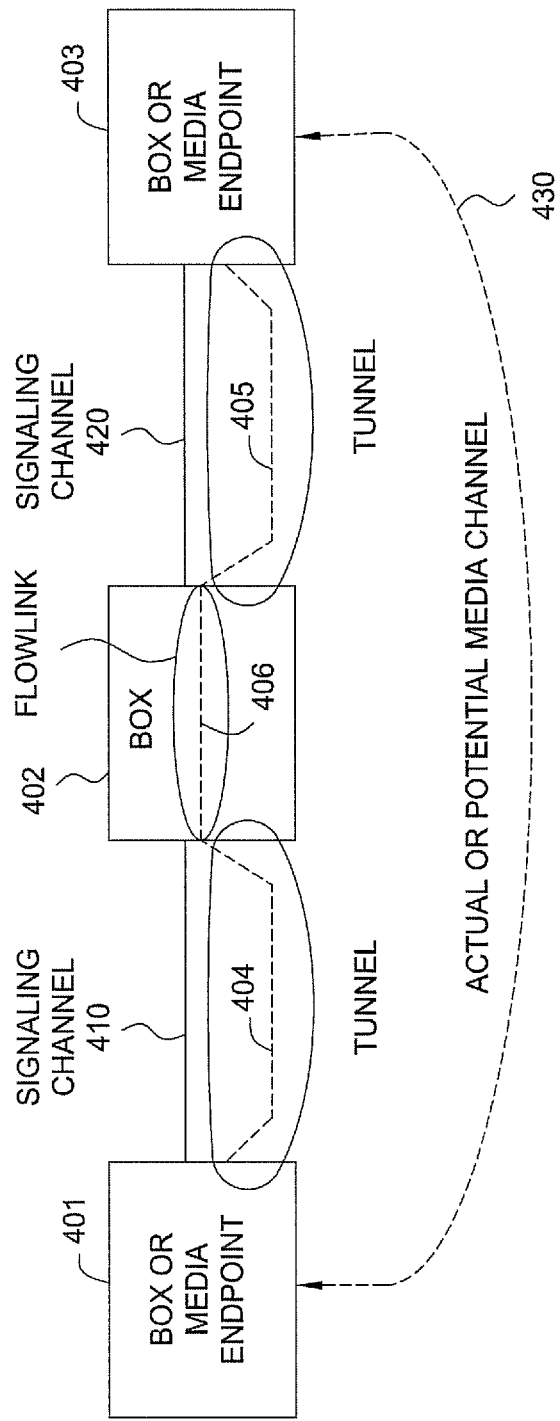
FIG. 4 illustrates an architecture for a distributed compositional medial control solution to the problem as illustrated in FIG. 3.

FIG. 4 illustrates an architecture 400 for a compositional media control solution to the problem as illustrated in FIG. 3. FIG. 4 contains a box or a media endpoint 401, a box 402, and a box or a media endpoint 403. In order to describe the architecture clearly, the following terminologies are provided below:

A box;
A signaling channel;
A tunnel; and
A signaling path.

A "box" refers to an independent module in a signaling path, whether it is a whole application server or a DFC-like feature module within an application server. All the boxes in FIG. 3 and FIG. 4 are peers. The example illustrated above in FIG. 3 includes the call waiting feature box 114a and the prepaid card feature box 114b.

A signaling channel refers to a two-way transmission channel for sending and receiving signaling protocols that operate on a First-In-First-Out (FIFO) basis. Signaling channels connect boxes and media endpoints, so that a signaling path between two media endpoints may consist of many signaling channels and boxes. The signaling channels 410 and 420 are used for connecting boxes 401 and 402, and boxes 402 and 403, respectively.

A tunnel refers to a logical partition of a signaling channel used to control one media channel. A tunnel is needed because one signaling channel can control multiple media channels.

A signaling path is defined as a maximal chain of tunnels and flowlinks (defined below). Tunnels 404 and 405 along with flowlink 406 establish a signaling path from box 401 to box 403. Each signaling path corresponds to an actual or a potential media channel, e.g. media channel 430.

Note that a signaling channel can control more than one media channel. Within each signaling channel, a different tunnel is used for each media channel controlled by the signaling channel. In the presence of boxes whose media-control functions must be composed, the media-control protocol is used piecewise rather than end-to-end. This means that each box acts as a protocol endpoint, and each tunnel of each signaling channel supports a separate and independent instance of the protocol.

In the compositional architecture illustrated in FIG. 4, the signaling paths between the two endpoints are assembled in accordance with the overall goal of the communications service. The feature boxes are located between the two endpoints and the feature box with the higher priority function from the perspective of an endpoint is located closest to that endpoint. Each feature box is an endpoint of some set of signaling channels. Within each signaling channel, the box is a protocol endpoint of some set of tunnels. The tunnel endpoints need to be identified and manipulated separately. A software abstraction that serves this purpose for the current invention is a "slot" as described below.

A slot refers to a software object that corresponds to an actual or a potential tunnel endpoint, and is associated with the role that the actual or potential tunnel plays within the box. Tunnel endpoints are dynamic and slots are static. A slot can be vacant, meaning that no tunnel endpoint is filling it, or it can be filled by a tunnel endpoint. During its lifetime a slot may be repeatedly vacant and filled again, as the corresponding media channel is repeatedly lost and then replaced or restored. There are five slot states: vacant; opened; opening; flowing; and closing. The state of a slot is its state as a tunnel endpoint. The descriptor of a slot is the most recent descriptor received from the other endpoint in an open, oack, or describe signal.

An object that controls one or two slots is called a link. The current invention utilizes the link object types: closelink; openlink; holdlink; and flowlink. Every slot is under the control of a Link object at all times. The Link object sees every signal received by a box through its slots, and mandates the sending of every signal sent by the box through its slots.

Although a slot is under control of a link at all times, it does not live its entire life within one link. Rather, the program moves slots from link to link to achieve its current goals. For example, a move may take a slot from one type of link to another, or it may take it from a flowlink with one slot partner to a flowlink with a different slot partner. When a Link object is created, it receives its slot or slots as arguments. Because slots are moved from link to link, a slot can enter a link in any state. Thus, the first action of a link is to query each slot to find out what state it is in. Then, having completed this initialization, the Link object proceeds to control its slot or slots until its slots are moved elsewhere and this Link object becomes garbage.

Slots are a powerful programming abstraction because they represent the roles of virtual segments of media channels within boxes, regardless of whether the media channels exist at the moment or not. Whether a media channel exists at a particular moment depends primarily on the media endpoints, and a box program has limited control over it. In the same way, links are a powerful programming abstraction because they represent goals for slots regardless of the states of the slots. This is important because many state changes within media servers are caused by timeouts, user commands, or other stimuli that are independent of slot states. With links, a program can simply react to such stimuli with a re-assignment of slots to links. The link implementation automatically takes care of the actual slot states, and of managing them so that the link goal is achieved.

It is important to note that the above description represents a particular view of IP media systems in which media sources, sinks, and processors are at the periphery of the system, while application servers are in the center. This view is convenient for understanding IP media control because it emphasizes the signaling/media separation, and isolates the media-control actions of servers. The view does not restrict actual system architecture, nor does it preclude other views. For example, any subset of the boxes in any of these diagrams can be implemented in the same physical component. In another example, a box that is an endpoint of two media streams can actually be mixing or transcoding the media streams, so that a user view of the system would place that media-processing box in the middle, and user devices at the periphery.

Any number of media channels can be setup along a signaling path. Each media channel can be opened and closed independently, from either end. There are no unnecessary constraints to get in the way, such as, "media channels controlled by a signaling channel must be opened by the same endpoint that initiated setup of the signaling channel."

In the current invention, either end of a tunnel may attempt to open a media channel by sending an open signal. The other end can respond affirmatively with oack or negatively with close. Either end can close the media channel at any time by sending a close, which must be acknowledged by the other end with a closeack.

Figure 5:
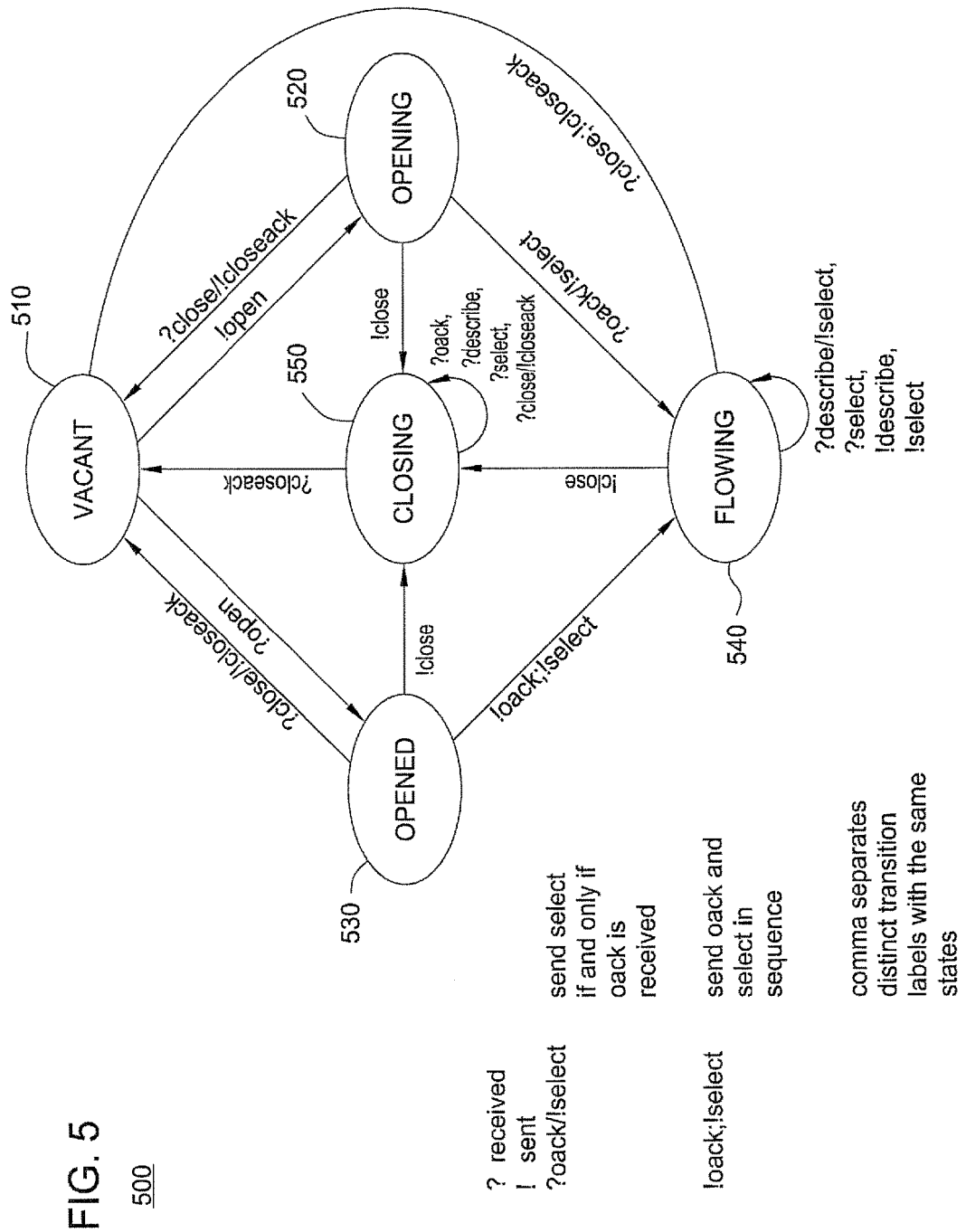
FIG. 5 illustrates a finite-state machine specification of the protocol of the current invention from the perspective of an endpoint.

FIG. 5 illustrates a finite-state machine specification of the protocol of the current invention from the perspective of an endpoint. An endpoint of the current invention may be in one of the following five states: a vacant state 510; an opening state 520; an opened state 530; a flowing state 540; or a closing state 550.

If an endpoint in a vacant state 510 receives an open, it enters the opened state 530. If an endpoint in a vacant state 510 sends an open, it enters the opening state 520.

If an endpoint in an opening state 520 receives an oack, it sends out a select and enters the flowing state 540. If an endpoint in an opening state 520 receives a close, it sends out a closeack and enters the vacant state 510. If an endpoint in an opening state 520 sends a close, it enters the closing state 550.

If an endpoint in an opened state 530 wishes to accept a media channel it sends an oack, sends out a select, and then enters the flowing state 540. If an endpoint in an opened state 530 receives a close, it sends out a closeack and enters the vacant state 510. If an endpoint in an opened state 530 sends a close, it enters the closing state 550.

If an endpoint in a flowing state 540 sends a describe or a select, it remains in the same state. If it sends a close, then the endpoint enters the closing state 550. If an endpoint in a flowing state 540 receives a describe, it sends a select and remains in the same state. If an endpoint in a flowing state 540 receives a select it simply remains in the same state. If an endpoint in a flowing state 540 receives a close, it sends a closeack and enters the vacant state 510.

If an endpoint in a closing state 550 receives an oack, a describe, or a select, it simply remains in the same state. If it receives a close, the endpoint sends a closeack and remains in the same state. If it receives a closeack, it then enters the vacant state 510.

An algorithm for implementing the finite state machine in Promela is provided in Table 1.

TABLE 1

Protocol from the perspective of an endpoint
Protocol for an endpoint

```
Protocol for an endpoint:
proctype endpoint (chan out, in) {
vacant:         do
                :: out!open→ goto opening
                :: in?open → goto opened
                od;
opening:        do
                :: in?oack→  out!select;
                             goto flowing
                :: in?close→ out!closeack;
                             goto vacant
                :: out!close→ goto closing
                od;
opened:         do
                :: out!oack→ out!select;
                             goto flowing
                :: out!close→ goto closing
                :: in?close→ out!closeack;
                             goto vacant
                od;
flowing:        do
                :: out!describe
                :: out!select
                :: out!close→ goto closing
                :: in?describe→out!select
                :: in?select
                :: in?close→ out!closeack;
                             goto vacant
                od;
closing:        do
                :: in?oack
                :: in?describe
                :: in?select
                :: in?close→ out!closeack
                :: in?closeack→goto vacant
                od;
}
```

The state of a Link object (a closelink, a flowlink, an openlink, or a holdlink) is derived from the state of its slot or slots. The flowlink has its states as the states of the two slots it is controlling. "closelink," "openlink," and "holdlink" have as their state as the state of the one slot they are controlling. All states are mutually exclusive. For Link objects, the current invention uses an abbreviation "live" for a link in either one of "opened," "opening" or "flowing" states, and an abbreviation "dead" for a link in either one of "closing" or "vacant" states.

Figure 6:
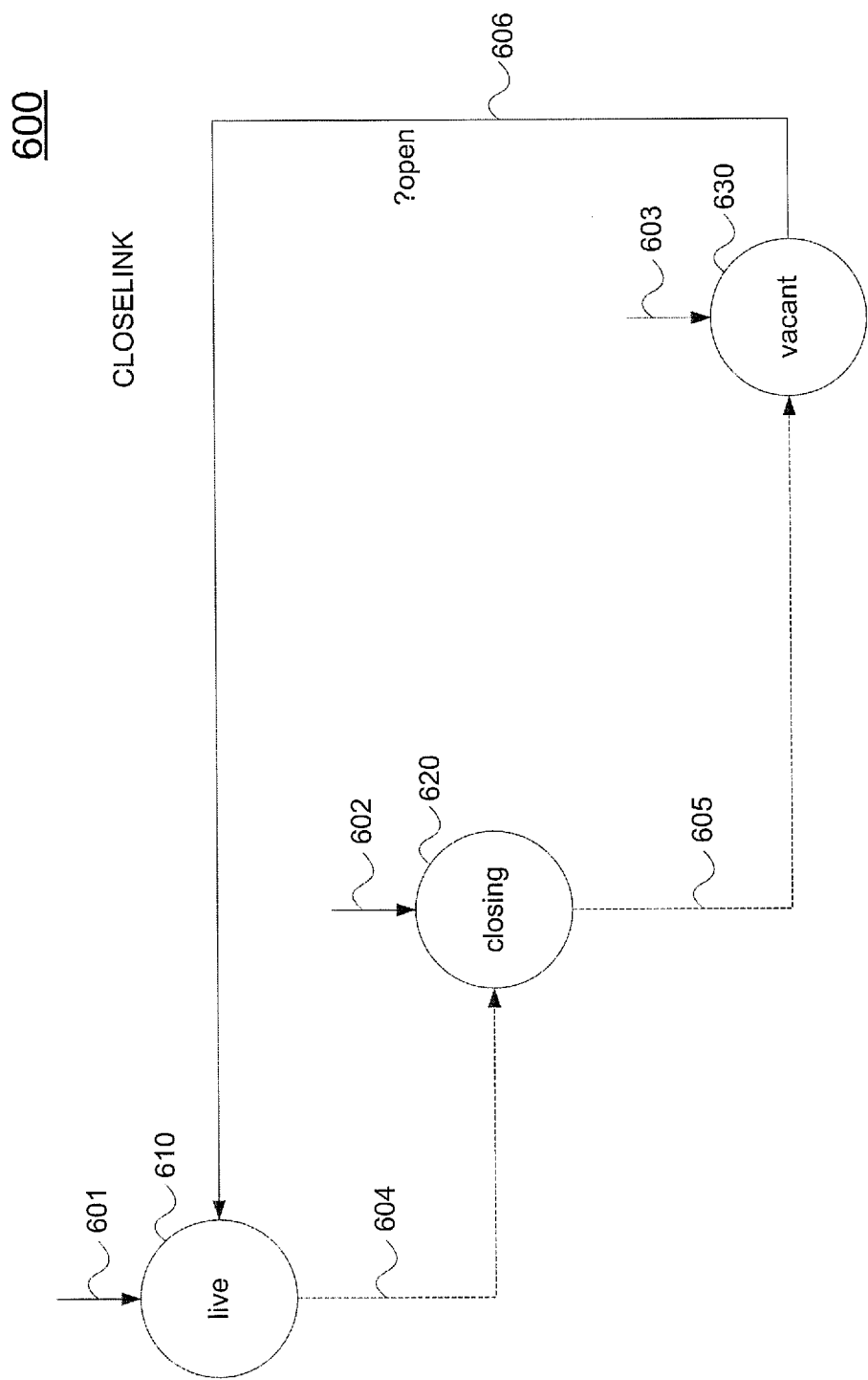
FIG. 6 illustrates the link type closelink.

FIG. 6 illustrates the link type closelink. Short arrows 601-603 with no origin indicate that the state an arrow is pointing to is a possible initial state. A dashed arrow 604 or 605 represents the work of a link program. The link may achieve the desired state transition by sending signals, sending stored descriptors, waiting for appropriate signals, or any combination of these actions. A solid arrow 606 represents the influence of the environment. That is, the influence of signals received from the other ends of signaling channels. They may also represent some work that the link does, as described above, in response to a received signal. The arrow shows the ultimate effect on the link state. For example, the dashed arrow 604 shows the ultimate effect on the link state of transitioning from a "live" state 610 to a "closing" state 620. The dashed arrow 605 shows the ultimate effect of transitioning from the "closing" state 620 to a "vacant" state 630.

Figure 7:
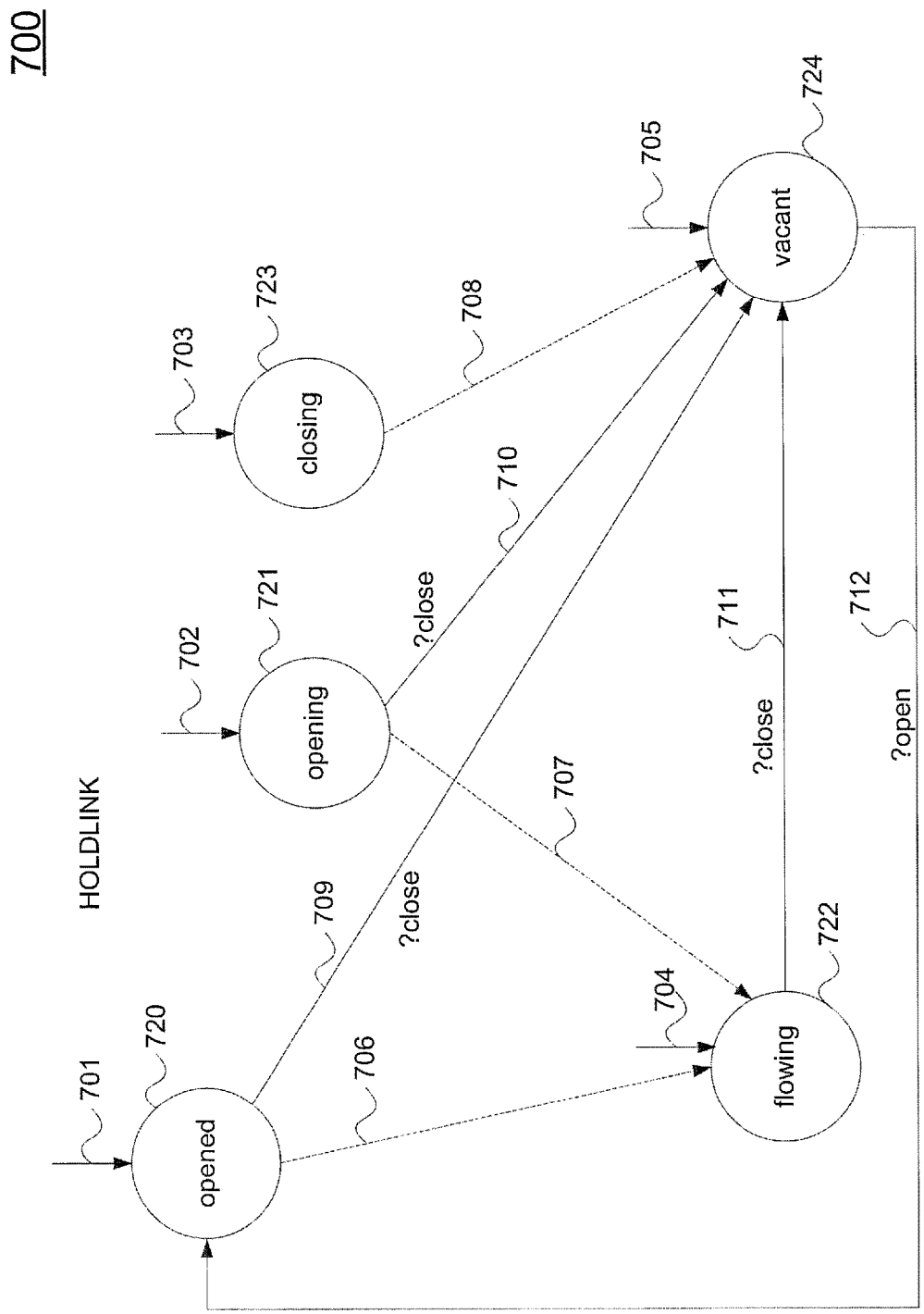
FIG. 7 illustrates the link type holdlink.

FIG. 7 illustrates the link type holdlink. The short arrows 701-705 with no origin indicate that the state an arrow is pointing to is a possible initial state. The dashed arrows 706-708 represent the work of a link program. The link may achieve the desired state transition by sending signals, sending stored descriptors, waiting for appropriate signals, or any combination of these actions. The solid arrows 709-712 represent the influence of the environment. That is, the influence of signals received from the other ends of signaling channels. They may also represent some work that the link does in response to a received signal. The arrow shows the ultimate effect on the link state. For example, the dashed arrows 706 and 707 show the ultimate effect on the link state of transitioning from an "opened" state 720 or "opening" state 721 to a "flowing" state 722. The dashed arrow 708 shows the ultimate effect of transitioning from the "closing" state 723 to a "vacant" state 724, and so on.

Figure 8:
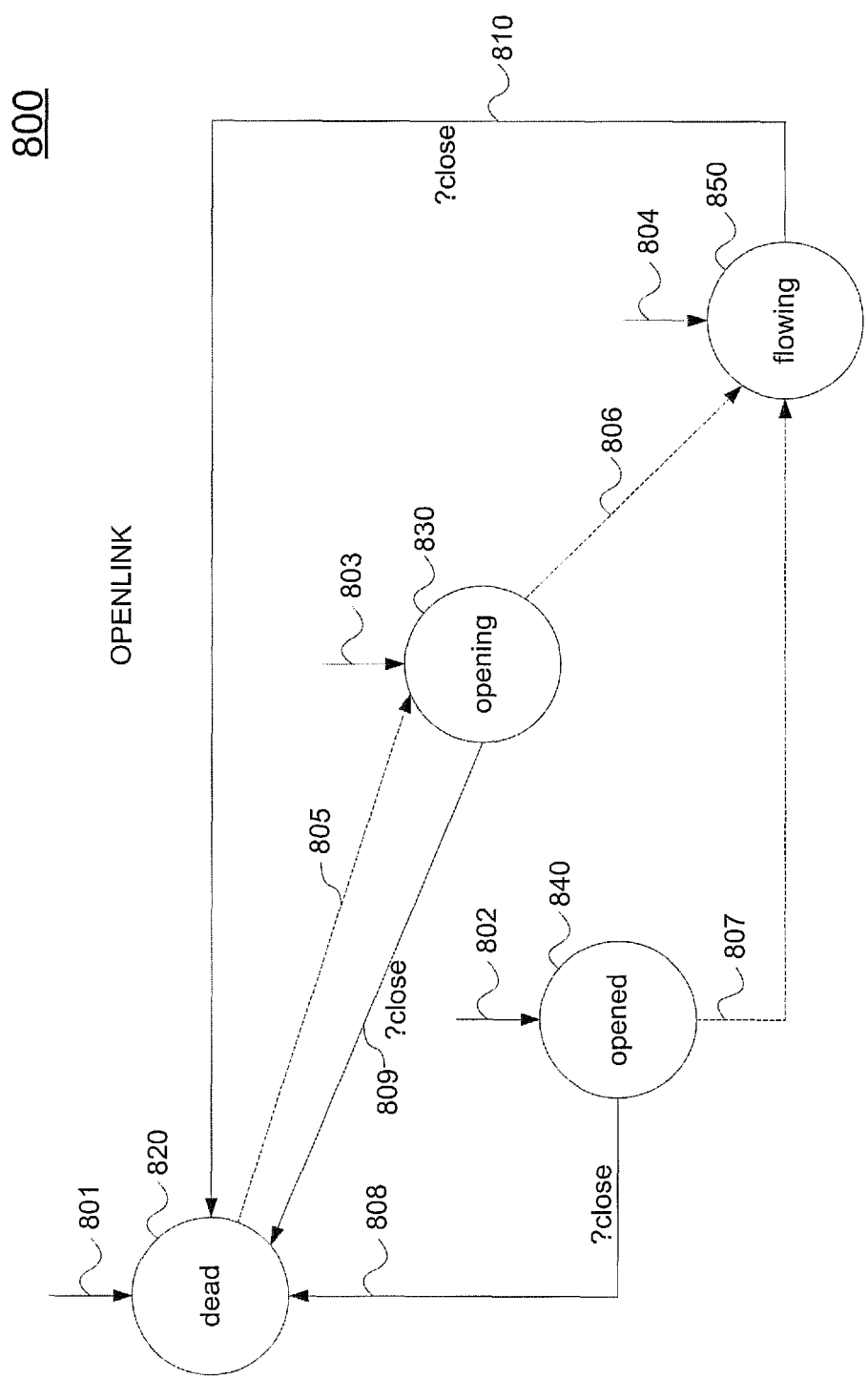
FIG. 8 illustrates the link type openlink.

FIG. 8 illustrates the link type openlink. Short arrows 801-804 with no origin indicate that the state the arrow is pointing to is a possible initial state. The dashed arrows 805-807 represent the work of a link program. The link may achieve the desired state transition by sending signals, sending stored descriptors, waiting for appropriate signals, or any combination of these actions. The solid arrows 808-810 represent the influence of the environment. That is, the influence of signals received from the other ends of signaling channels. They may also represent some work that the link does in response to a received signal. The arrow shows the ultimate effect on the link state. For example, the dashed arrow 805 shows the ultimate effect on the link state of transitioning from a "dead" state 820 to an "opening" state 830. The dashed arrow 807 shows the ultimate effect on the link state of transitioning from an "opened" state 840 to a "flowing" state 850, and so on.

Figure 9:
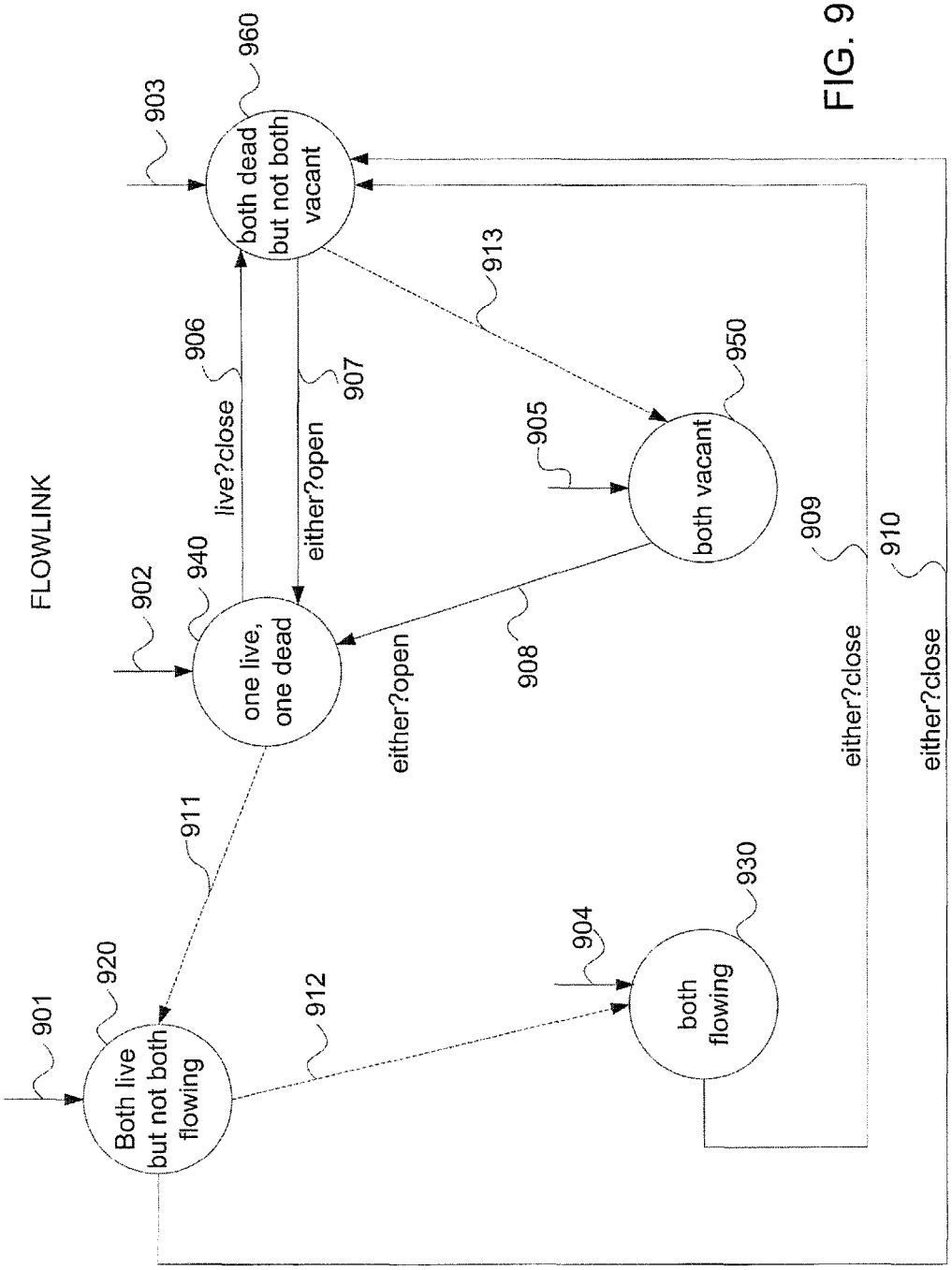
FIG. 9 illustrates the link type flowlink.

FIG. 9 illustrates the link type flowlink. Note that the flowlink has its states as the states of the two slots it is controlling. Short arrows 901-905 with no origin indicate that the state the arrow is pointing to is a possible initial state. The dashed arrows 911-913 represent the work of a link program. The link may achieve the desired state transition by sending signals, sending stored descriptors, waiting for appropriate signals, or any combination of these actions. The solid arrows 906-910 represent the influence of the environment. That is, the influence of signals received from the other ends of signaling channels. They may also represent some work that the link does in response to a received signal. The arrow shows the ultimate effect on the link state. For example, the dashed arrow 911 shows the ultimate effect on the link state of transitioning from a state 940 in which one slot is "live" and one slot is "dead" to a state 920 in which "both slots are live but not both flowing." The dashed arrow 912 shows the ultimate effect on the link state of transitioning from a state 920 in which "both slots are live but not both flowing" to a state 930 in which "both slots are flowing." The dashed arrow 913 shows the ultimate effect on the link state of transitioning from a state 960 in which "both slots are dead but not both vacant" to a state 950 in which "both slots are vacant", and so on.

Figure 10:
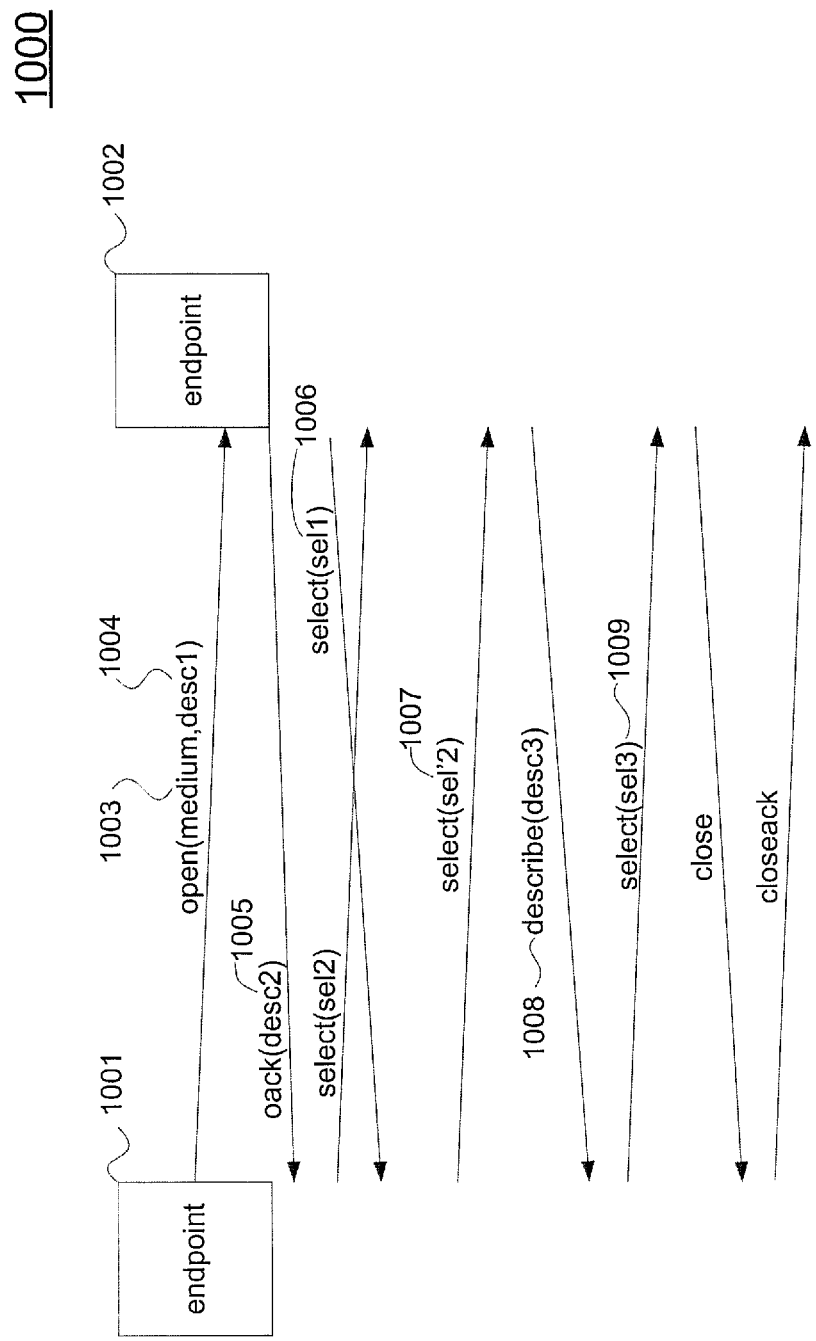
FIG. 10 illustrates an exemplary scenario in which the protocol of the current invention is used to open, modify, and close a media channel.

FIG. 10 illustrates an exemplary scenario in which the protocol of the current invention is used to open, modify, and close a media channel. The media channel is being opened and closed between endpoints 1001 and 1002. Each open signal carries the type of media channel being requested

1003, and a descriptor 1004. A descriptor is a record in which an endpoint describes itself as a receiver of a media. A descriptor contains an IP address, port number, and a priority-ordered list of codecs that it can handle. For every medium there is a common-denominator codec that all endpoints of that medium can handle. This common codec is an entry in the codec list of every descriptor for the medium.

Each oack signal also carries a descriptor 1005, describing the channel acceptor as a receiver of media. A selector is a record in which an endpoint declares its intention to send to the endpoint described by a descriptor, and indicates the codec it will be using. A selector contains identification of the descriptor it is responding to, the IP address and port number of the sender, and a single selected codec 1006 from the list in the descriptor. For optimal codec choice, the sender may choose the highest-priority codec that it is able and willing to send.

When a channel is first being established, the opened end sends an oack signal and then a select signal carrying a selector. The selector is a response to the descriptor in the open signal. The initiator's response to the descriptor in the oack signal is carried in another select signal. The descriptors and selectors have numbers to indicate which selector is responding to which descriptor. Either endpoint can send media as soon as it has sent a selector. An endpoint should be ready to receive media as soon as it has received a selector.

At any time after sending the first selector in response to a descriptor, an endpoint can choose a new codec from the list in the descriptor, send it as a selector in a select signal 1007, and begin to send media in the new codec. In FIG. 10, select(sel'2) shows this possibility.

At any time after sending or receiving oack, an endpoint can send a new descriptor for itself in a describe signal 1008. The endpoint that receives the new descriptor must begin to act according to the new descriptor. This might mean sending to a new address or choosing a new codec. In any case, the receiver of the descriptor must respond with a new selector in a select signal 1009, if only to show that it has received the descriptor. In FIG. 10, descriptor3 and selector3 illustrate this interaction.

There is often a need to interrupt the media flow, temporarily, of an established media channel. Both interruption and resumption of media flow are signaled with descriptors and selectors. There are many possible ways to encode this information. The current method assumes that there is a distinguished descriptor "noMedia" that means "do not send to me" and a distinguished selector "noMedia" that means "I am not sending to you." The only legal response to a descriptor "noMedia" may be then a selector "noMedia."

The describe signal makes it possible for a true media endpoint to change its characteristics as a receiver of media. This is useful, but—because the protocol is used piecewise, and every box is a protocol endpoint—most describe signals are sent by application servers.

Figure 11:
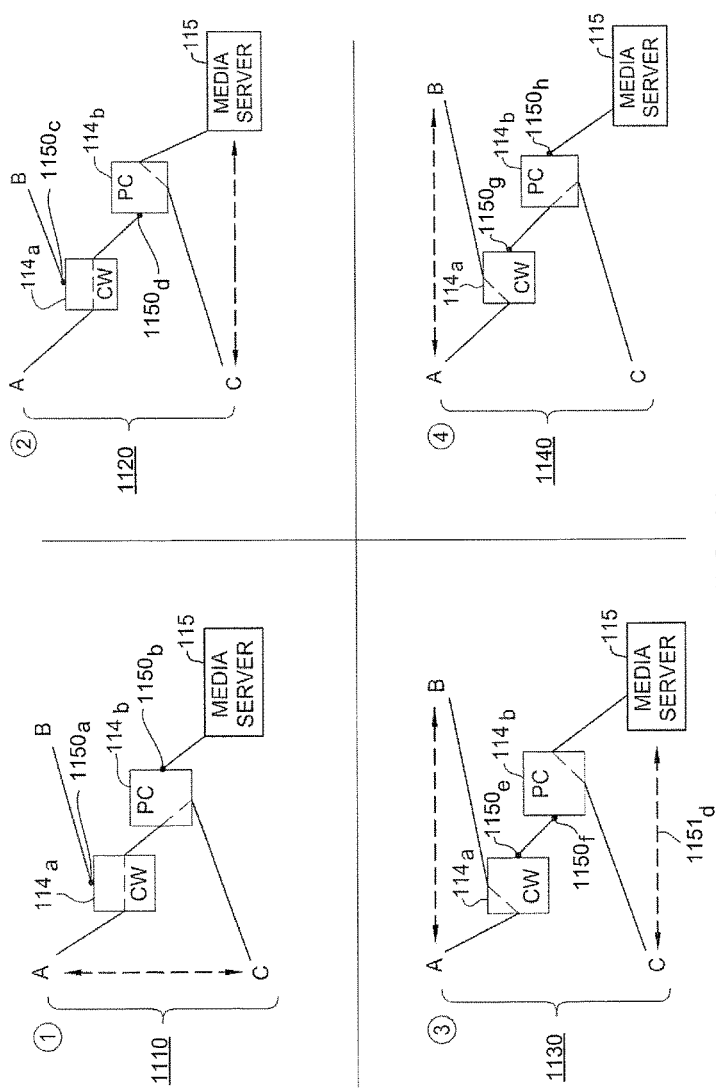
FIG. 11 illustrates an implementation of the current invention for the example described earlier in FIG. 3.

For example, consider the exemplary scenario illustrated in FIG. 3. FIG. 11 illustrates an implementation of the current invention for the example described earlier in FIG. 3. The snapshots 1110, 1120, 1130 and 1140 replace snapshots 310, 320, 330 and 340 when the current invention is implemented. When a server (e.g. a call waiting server 114a or a prepaid card server 114b) wants a media flow between two endpoints, it puts the two signaling channels that extend from the server to those endpoints under control of a flowlink object. When a server wants to interrupt a media flow to an endpoint, it puts the signaling channel to that endpoint under control of a holdlink object. The holdlink object is depicted as a black dot 1150a-1150h in FIG. 11. Note that the current example uses the flowlink and holdlink objects but not the openlink and closelink objects.

For the transition from Snapshot 1110 to Snapshot 1120 (corresponding to a transition from snapshot 310 to 320 in FIG. 3), the prepaid card application server 114b sends a describe signal with descriptor noMedia to A; a describe signal with the descriptor of C to the media server 115; and a describe signal with the descriptor of media server 115 to C. The prepaid card application server 114b has these descriptors available because it has recorded them as they passed through in previous signals. The answering select signal from A is absorbed by the prepaid card application server 114b; and the answering select signals from C and the media server 115 are sent to each other. These signals cause the actual media path 1151d to change as indicated in FIG. 11.

It is important to note that to make media control as easy as possible, describe signals (and their answering selects) going in opposite directions in the same tunnel do not constrain each other. This means that changes initiated in both directions can proceed concurrently. In addition, the protocol has no enforced pairing of describe/select signals relevant to media transmission in one direction. A describe can be sent at any time, even if no select has been received in response to the last describe. A select can be sent at any time, even if no describe has been received since the last select was sent. This makes box state simpler and eliminates unnecessary constraints.

The protocol of the current invention facilitates composition while it also yields an optimal choice of codec. In each direction of a media channel, the sender sends the best codec it is currently willing to send, from the viewpoint of the receiver. Note that the two directions of a media channel may have different codecs. The selector identifies a single codec because many media endpoints must allocate resources to whatever codec they are receiving. When media endpoints receive a new selector with a new codec, the received selector triggers the media endpoints to perform reconfiguration. Media sources may wish to send different codecs even within the same media session. For example, a resource that plays recorded speech may have speech files that were stored in several different codecs.

In one embodiment, an endpoint begins "listening" for media in accordance with a descriptor as soon as it has sent the descriptor and begins accepting packets immediately to make sure that no media is lost even if a media packet travels through the network faster than signals.

In another embodiment, an endpoint waits for a select signal and risks the loss of a few packets that arrive before their corresponding selectors.

The current method provides a distributed method for compositional control of IP media. The method also provides optimal codec choice. The method first implements an algorithm for distributed compositional media control in each application server (box).

In one embodiment, the method defines a box object that calls on Link and Slot objects when necessary. The method also defines a map object that maintains a dynamic association among signaling channels, tunnels, slots, and links. When a box receives a signal, the box uses these associations in the map object to find the link to which it should show the received signal. Both boxes and links may obtain the current state of a slot; links also may obtain a current descriptor for a slot. When the box receives a signal, it passes the signal to the controlling link. In processing the signal, the link passes the signal to the slot, so that the slot can keep its local variables up-to-date. A link also sends a signal by passing it to the slot.

The OpenLink, CloseLink, and HoldLink programs each control a single slot. The code of each slot is structured as a finite-state machine that follows the structure of FIG. 5. A FlowLink object caches the current state and most recently received descriptor of both its slots. The design is built around the following concepts: A slot is described if the link has received a current descriptor for it. Slots in the opened and flowing states are described, while slots in other states are not; and each slot has a Boolean variable up-to-date (utd) that is true if and only if the other slot is described and this slot has been sent its most recent descriptor. The link is working towards maintaining the Boolean variable up-to-date and true. The utd variable collapses all the relevant history into two Boolean values, so the flowlink can always do the correct thing just by consulting them.

Figure 12:
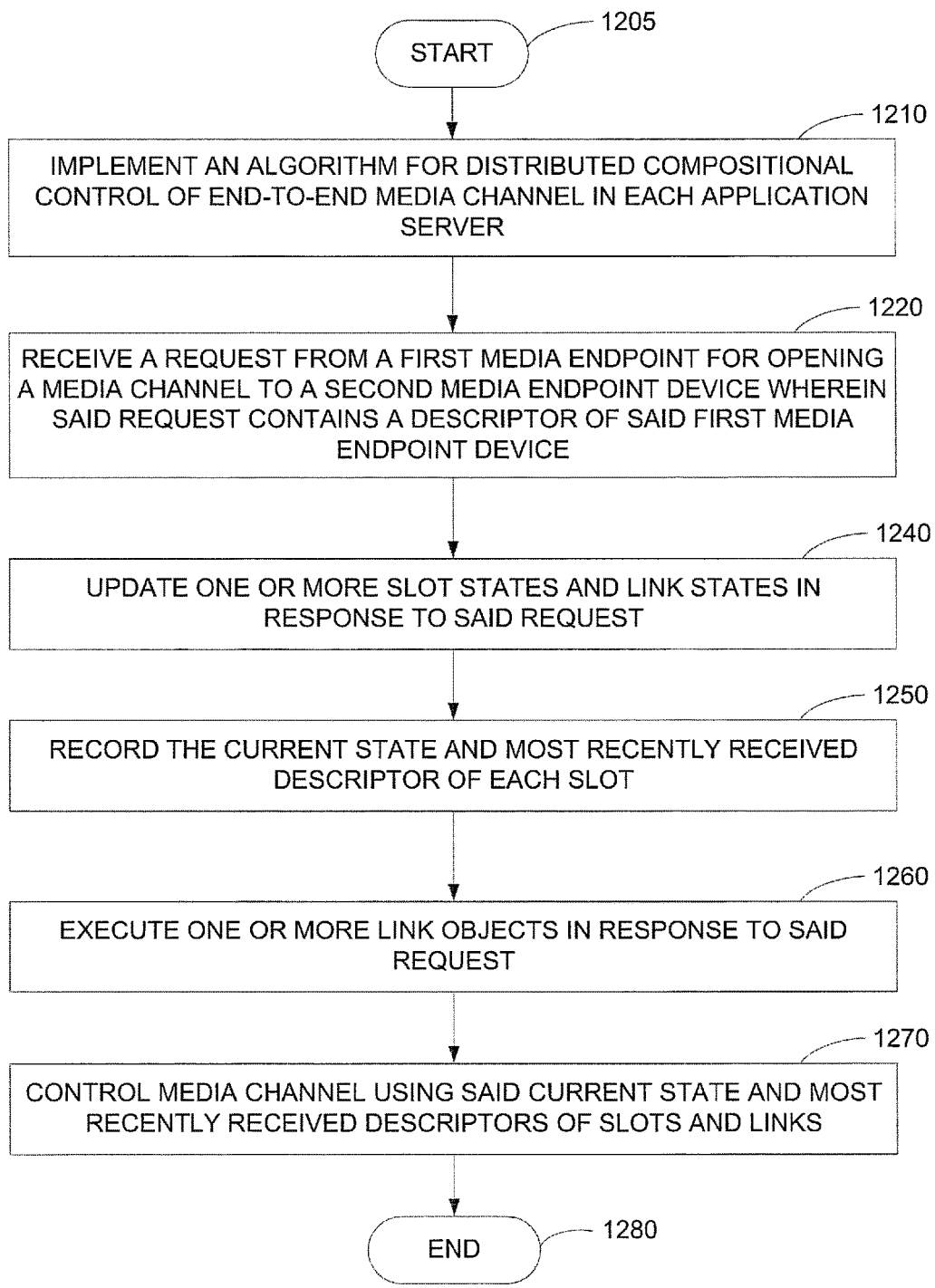
FIG. 12 illustrates a flowchart of the method for providing distributed compositional control of an end-to-end media channel.

FIG. 12 illustrates a flowchart of the method 1200 of the current invention for providing distributed compositional control of an end-to-end media channel. Method 1200 begins in step 1205 and proceeds to step 1210.

In step 1210, method 1200 implements an algorithm for distributed compositional control of end-to-end media channel in each application server. For example, an algorithm of the current invention provided in Table 1 is implemented in various application servers such as servers for call waiting, prepaid card, etc.

In step 1220, method 1200 receives a request from a first media endpoint device for opening a media channel to a second media endpoint device wherein said request contains a descriptor of said first media endpoint device.

In step 1240, method 1200 updates one or more slot states and link states in response to said request. For example, if a media channel is being closed and an acknowledgement for the close is received, the slot state is updated to vacant.

In step 1250, method 1200 records the current state and most recently received descriptor of each slot. For example, if a media channel was established between two endpoints and the feature box is in the signaling path of the media channel, the feature box records the descriptors for the two slots used for the media.

In step 1260, method 1200 executes one or more link objects in response to said request. For example, if a request to close a media channel is received while in a live state, the method executes a closelink object and proceeds to a closing state.

In step 1270, method 1200 controls said media channel using said current state and most recently received descriptors of slots and links. The descriptor of a slot is the most recent descriptor received from the other endpoint in an open, oack, or describe signal. If the box doesn't know the descriptors of the slots and links, the box may also query the slots to receive an up to date state. The method then proceeds to step 1280.

Method 1200 ends in step 1280.

Figure 13:
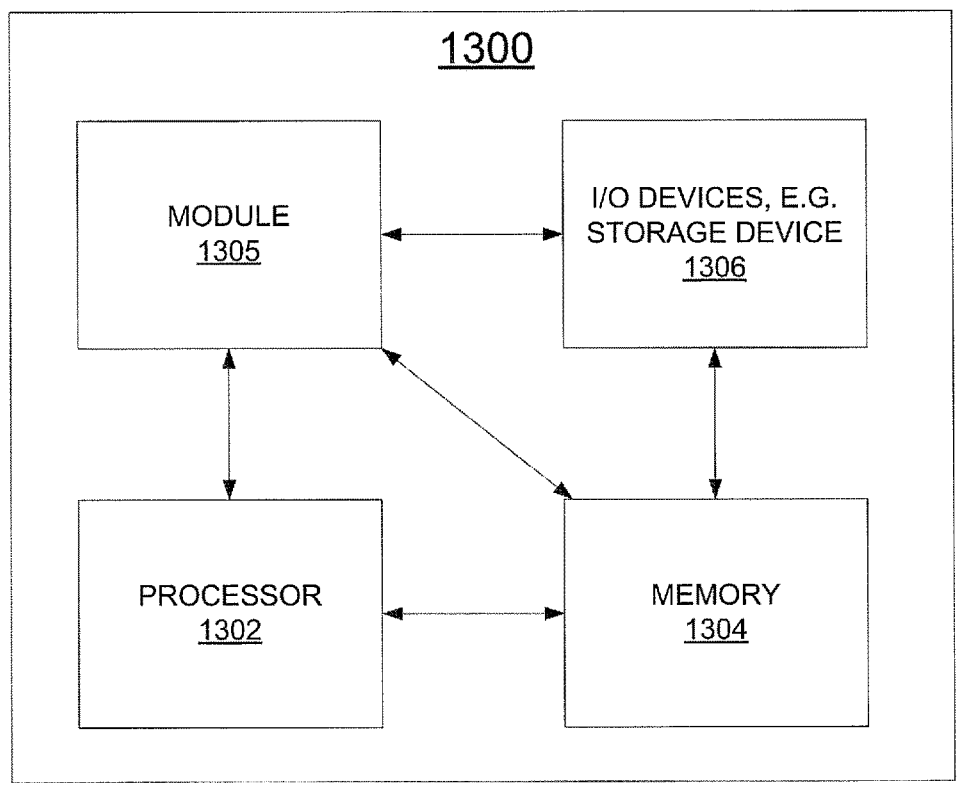
FIG. 13 illustrates a high-level block diagram of a general-purpose computer suitable for use in performing the functions described herein.

FIG. 13 depicts a high-level block diagram of a general-purpose computer suitable for use in performing the functions described herein. As depicted in FIG. 13, the system 1300 comprises a processor element 1302 (e.g., a CPU), a memory 1304, e.g., random access memory (RAM) and/or read only memory (ROM), a module 1305 for providing distributed compositional control of end-to-end media for services on IP networks, and various input/output devices 1306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 1305 for providing distributed compositional control of end-to-end media for services on IP networks can be loaded into memory 1304 and executed by processor 1302 to implement the functions as discussed above. As such, the present method 1305 for providing distributed compositional control of end-to-end media for services on IP networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a control of at least one media channel in a communication network, the method comprising:

receiving, by a processor, a request from a first media endpoint device for closing the at least one media channel to a second media endpoint device, wherein the request contains a descriptor of the first media endpoint device;

updating, by the processor, a state of a slot and a state of a link in response to the request, wherein the slot comprises an object that corresponds to a potential tunnel endpoint, wherein the link comprises an object that controls the slot;

recording, by the processor, a current state of the slot for supporting the at least one media channel;

recording, by the processor, the descriptor of the first media endpoint device as a most recent descriptor for the slot supporting the at least one media channel; and executing, by the processor, the object of the link in response to the request for closing the at least one media channel.

2. The method of claim 1, wherein the descriptor for the slot is the most recent descriptor received in a close signal from the first media endpoint device.

3. The method of claim 1, wherein the descriptor for the slot is the most recent descriptor received in a closeack signal from the first media endpoint device.

4. The method of claim 1, wherein the descriptor for the slot is the most recent descriptor received in a describe signal from the first media endpoint device.

5. The method of claim 1, wherein the communication network is an internet protocol network.

6. The method of claim 1, wherein the at least one media channel is a bi-directional media channel, and where each direction of the bi-directional media channel is controlled independently.

7. The method of claim 1, wherein the response to the request comprises a close acknowledgement.

8. The method of claim 1, wherein the method is performed by a feature box, wherein each of: the feature box, the first media endpoint device, and the second media endpoint device is representative of an endpoint for a signaling channel.

9. The method of claim 8, wherein each of: the first media endpoint device and the second media endpoint device for the signaling channel is capable of initiating or accepting the request.

10. The method of claim 8, wherein each of: the first media endpoint device and the second media endpoint device for the signaling channel is in one of: a vacant state, an opened state, an opening state, a flowing state, or a closing state.

11. The method of claim 8,
wherein the at least one media channel comprises a plurality of media channels; and
wherein each of: the feature box, the first media endpoint device, and the second media endpoint device has an ability to control the plurality of media channels to the second media endpoint device.

12. A non-transitory computer-readable medium storing a plurality of instructions which, when executed by a processor, cause the processor to perform operations for providing a control of at least one media channel in a communication network, the operations comprising:
receiving a request from a first media endpoint device for closing the at least one media channel to a second media endpoint device, wherein the request contains a descriptor of the first media endpoint device;
updating a state of a slot and a state of a link in response to the request, wherein the slot comprises an object that corresponds to a potential tunnel endpoint, wherein the link comprises an object that controls the slot;
recording a current state of the slot for supporting the at least one media channel;
recording the descriptor of the first media endpoint device as a most recent descriptor for the slot supporting the at least one media channel; and
executing the object of the link in response to the request for closing the at least one media channel.

13. The non-transitory computer-readable medium of claim 12, wherein the descriptor for the slot is the most recent descriptor received in a close signal, a closeack signal, or a describe signal from the first media endpoint device.

14. The non-transitory computer-readable medium of claim 12, wherein the communication network is an internet protocol network.

15. The non-transitory computer-readable medium of claim 12, wherein the at least one media channel is a bi-directional media channel, and where each direction of the bi-directional media channel is controlled independently.

16. The non-transitory computer-readable medium of claim 12, wherein the response to the request comprises a close acknowledgement.

17. The non-transitory computer-readable medium of claim 12, wherein the operations are performed by a feature box, wherein each of: the feature box, the first media endpoint device, and the second media endpoint device is representative of an endpoint for a signaling channel.

18. The non-transitory computer-readable medium of claim 17, wherein each of: the first media endpoint device and the second media endpoint device for the signaling channel is capable of initiating or accepting the request.

19. The non-transitory computer-readable medium of claim 17, wherein each of: the first media endpoint device and the second media endpoint device for the signaling channel is in one of: a vacant state, an opened state, an opening state, a flowing state, or a closing state.

20. An apparatus for providing a control of at least one media channel in a communication network, the apparatus comprising:
a processor; and
a non-transitory computer-readable medium storing a plurality of instructions which, when executed by the processor, cause the processor to perform operations, the operations comprising:
receiving a request from a first media endpoint device for closing the at least one media channel to a second media endpoint device, wherein the request contains a descriptor of the first media endpoint device;
updating a state of a slot and a state of a link in response to the request, wherein the slot comprises an object that corresponds to a potential tunnel endpoint, wherein the link comprises an object that controls the slot;
recording a current state of the slot for supporting the at least one media channel;
recording the descriptor of the first media endpoint device as a most recent descriptor for the slot supporting the at least one media channel; and
executing a link the object of the link in response to the request for closing the at least one media channel.

\* \* \* \* \*